INVENTOR.
Rene J. Gaubert
BY
Flehr and Swain
ATTORNEYS

Sept. 19, 1961 R. J. GAUBERT 3,001,025

MAGNETIC TAPE APPARATUS

Filed Nov. 28, 1956

14 Sheets-Sheet 2

INVENTOR.
Rene J. Gaubert

BY Fisher and Swain

ATTORNEYS

INVENTOR.
Rene J. Gaubert
BY Fehr and Swain
ATTORNEYS

Sept. 19, 1961 R. J. GAUBERT 3,001,025

MAGNETIC TAPE APPARATUS

Filed Nov. 28, 1956 14 Sheets-Sheet 4

INVENTOR.
Rene J. Gaubert

BY

Flehr and Swain

ATTORNEYS

Sept. 19, 1961 R. J. GAUBERT 3,001,025

MAGNETIC TAPE APPARATUS

Filed Nov. 28, 1956 14 Sheets-Sheet 5

INVENTOR.
Rene J. Gaubert

BY [signature]

ATTORNEYS

Sept. 19, 1961

R. J. GAUBERT 3,001,025

MAGNETIC TAPE APPARATUS

Filed Nov. 28, 1956

14 Sheets-Sheet 6

INVENTOR.
Rene J. Gaubert

BY Fleher and Swann

ATTORNEYS

Sept. 19, 1961 R. J. GAUBERT 3,001,025

MAGNETIC TAPE APPARATUS

Filed Nov. 28, 1956

14 Sheets-Sheet 7

INVENTOR.

Rene J. Gaubert

BY Flehr and Swain

ATTORNEYS

Sept. 19, 1961

R. J. GAUBERT 3,001,025

MAGNETIC TAPE APPARATUS

Filed Nov. 28, 1956

14 Sheets-Sheet 8

INVENTOR.
Rene J. Gaubert

BY

Flehr & Swain

ATTORNEYS

Sept. 19, 1961 R. J. GAUBERT 3,001,025

MAGNETIC TAPE APPARATUS

Filed Nov. 28, 1956

14 Sheets-Sheet 9

INVENTOR.
Rene J. Gaubert

BY Flehr and Swain

ATTORNEYS

INVENTOR.
Rene J. Gaubert
BY Flehr & Swain
ATTORNEYS

Sept. 19, 1961 R. J. GAUBERT 3,001,025

MAGNETIC TAPE APPARATUS

Filed Nov. 28, 1956 14 Sheets-Sheet 11

INVENTOR.
Rene J. Gaubert

BY Flehr and Swain

ATTORNEYS

Sept. 19, 1961 R. J. GAUBERT 3,001,025

MAGNETIC TAPE APPARATUS

Filed Nov. 28, 1956

14 Sheets-Sheet 12

INVENTOR.

Rene J. Gaubert

BY Flehr and Swain

ATTORNEYS

Sept. 19, 1961 R. J. GAUBERT 3,001,025

MAGNETIC TAPE APPARATUS

Filed Nov. 28, 1956 14 Sheets-Sheet 13

INVENTOR.
Rene J. Gaubert
BY
Fehr and Swain
ATTORNEYS

Sept. 19, 1961 R. J. GAUBERT 3,001,025

MAGNETIC TAPE APPARATUS

Filed Nov. 28, 1956 14 Sheets-Sheet 14

INVENTOR.
Rene J. Gaubert
BY Flehr and Swain
ATTORNEYS 3,001,025

MAGNETIC TAPE APPARATUS

Rene J. Gaubert, 4206 Oakmore Road, Oakland, Calif.

Filed Nov. 28, 1956, Ser. No. 626,071
25 Claims. (Cl. 179—100.2)

This invention relates generally to magnetic tape apparatus, and more particularly to magnetic tape apparatus of the type in which several magnetic tapes can be operated upon in a preselected manner and magnetic tape magazines therefor. The present application is a continuation-in-part of subject matter disclosed in co-pending application Serial No. 463,889, filed October 22, 1954, now Patent No. 2,821,576 for "Magnetic Tape Apparatus."

In the co-pending application, there is disclosed a magnetic tape apparatus in which a plurality of magnetic tape magazines each serving to carry magnetic tape therein are placed in side-by-side relationship and a magnetic transducing head is adapted to be selectively moved opposite predetermined ones of said magazines. Relative movement between the selected magazine and head brings the head into cooperative relationship with the tape of the same. Simultaneously, a tape drive serves to drive the tape past the head.

In apparatus of the above character, it is desirable to be able to rapidly and easily replace magazines. It is also desirable to have a magazine which is easily insertable and which occupies a minimum of space and yet protects the tape carried therein. The select mechanism should be relatively simple whereby the machine is easy to service. A relatively inexpensive machine is desirable for home and industrial use.

It is, therefore, a general object of the present invention to provide an improved magnetic tape apparatus.

It is another object of the present invention to provide a relatively simple selecting mechanism for magnetic tape apparatus of the above character.

It is another object of the present invention to provide an improved magnetic tape magazine.

It is another object of the present invention to provide a magnetic tape apparatus in which a plurality of magnetic tape magazines are removably held in side-by-side relationship in the apparatus and in which a magnetic transducing means is adapted to selectively operate upon the tape accommodated in the selected magazine.

It is another object of the present invention to provide a machine of the above character in which the magnetic tape is carried by magazines which facilitate insertion and removal of individual tapes into the apparatus.

It is another object of the present invention to provide a magnetic tape apparatus which may be coin operated.

It is a further object of the present invention to provide a novel select mechanism for apparatus of the above character whereby the tape carried by the magazines may be operated upon in a preselected order.

It is still a further object of the present invention to provide a tape magazine which provides suitable tape tension to maintain constant tape feed rates.

These and other objects of the invention will become more apparent from the following description in which the preferred embodiment of the invention has been shown in detail in conjunction with the accompanying drawing.

Referring to the drawing:

FIGURES 1A—B show a front elevational view illustrating one embodiment of apparatus which incorporates the invention;

Figure 1A:
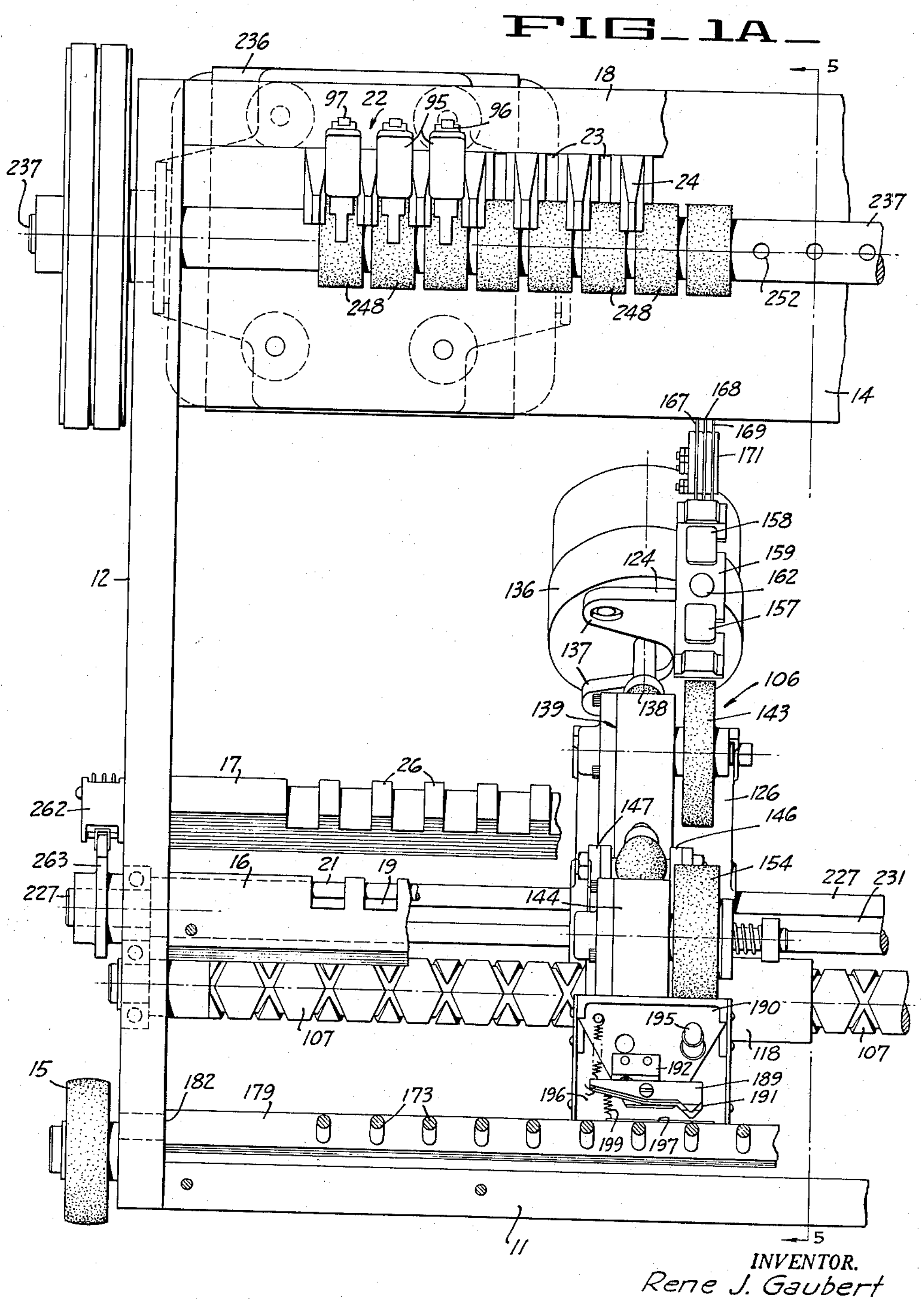
Figure 2:
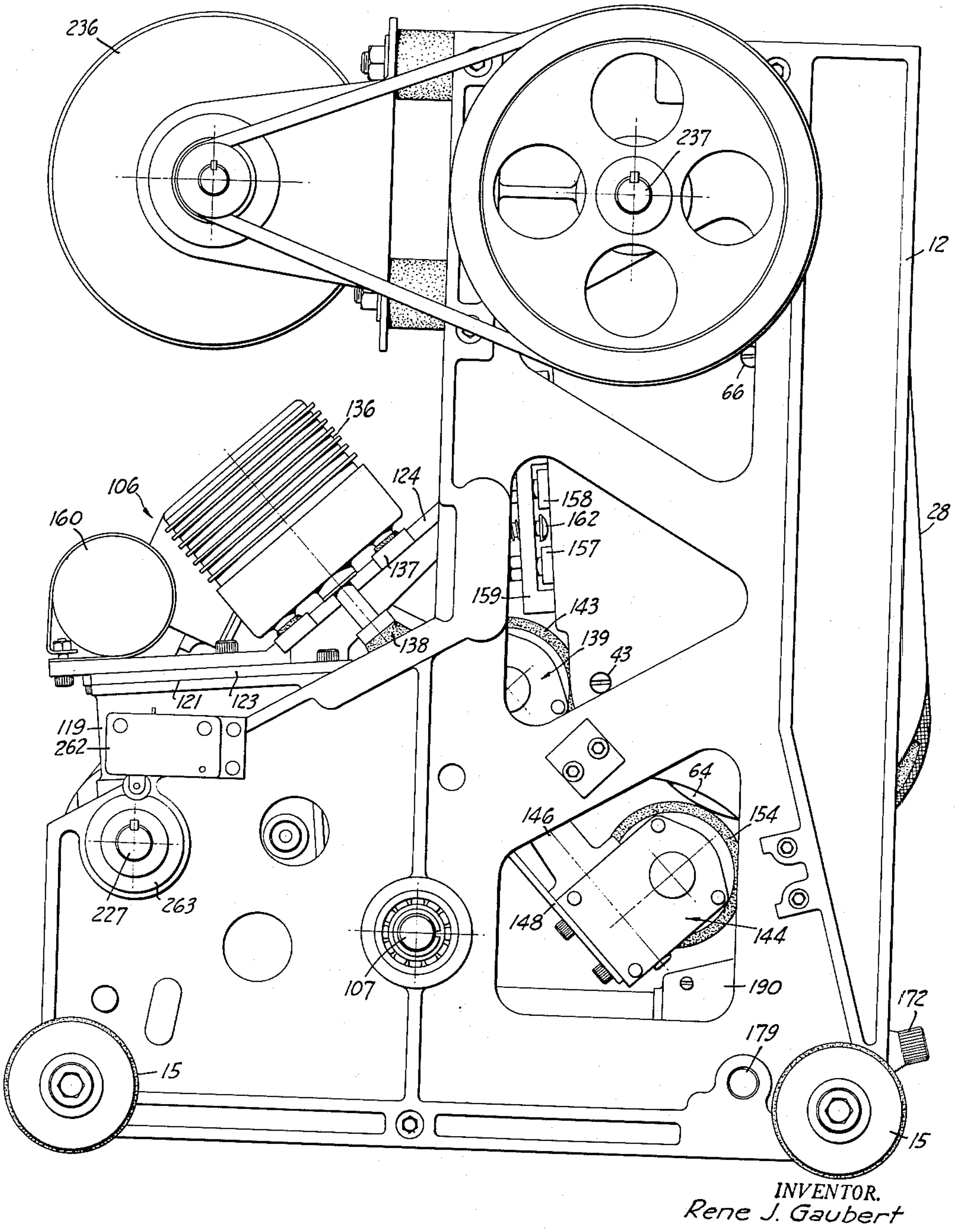
FIGURE 2 is a side elevational view as viewed from the left side of FIGURE 1A.
Figure 3:
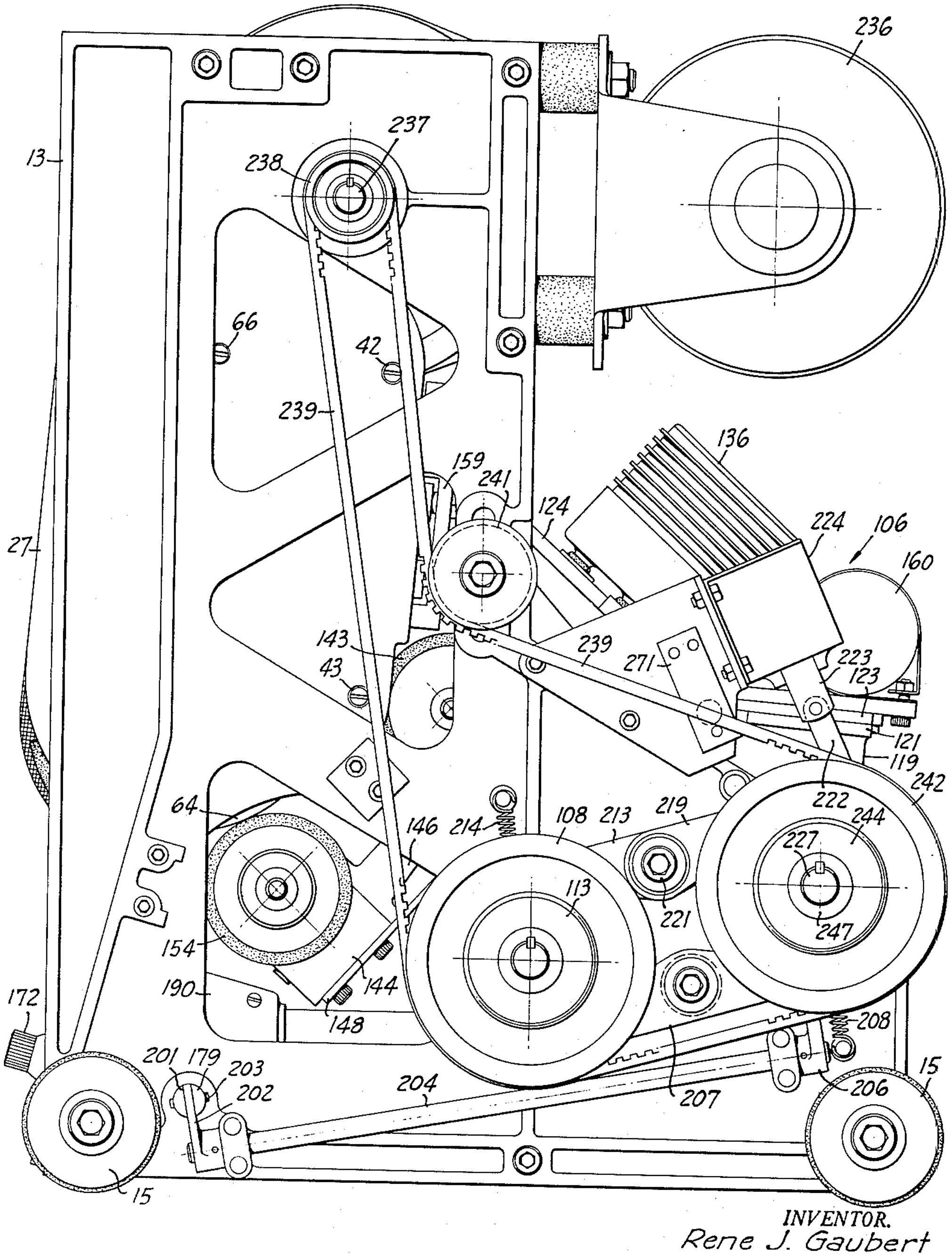
FIGURE 3 is a side elevational view as viewed from the right side of FIGURE 1B.

Generally, the apparatus comprises a base 11, side members 12 and 13, and cross frame 14. Resilient rollers 15 may be mounted on the side frames of the apparatus to absorb any vibrations and to facilitate moving the same.

Magazines, to be presently described, are carried in side-by-side relationship by the supports 16, 17 and 18 which extend across the apparatus and have their ends suitably secured to the side members. The support 16 has a plurality of equally spaced notches 19 formed therein. The width of each notch is such that a magazine can be accommodated therein. Pivot pins 21 are mounted near the top of the notches and serve to pivotally engage the end of the magazine. As will be presently described, each of the magazines is inserted in the apparatus by engaging a pivot pin by a notch formed in the end of the magazine and then pivoting the magazine inwardly.

Figure 23:
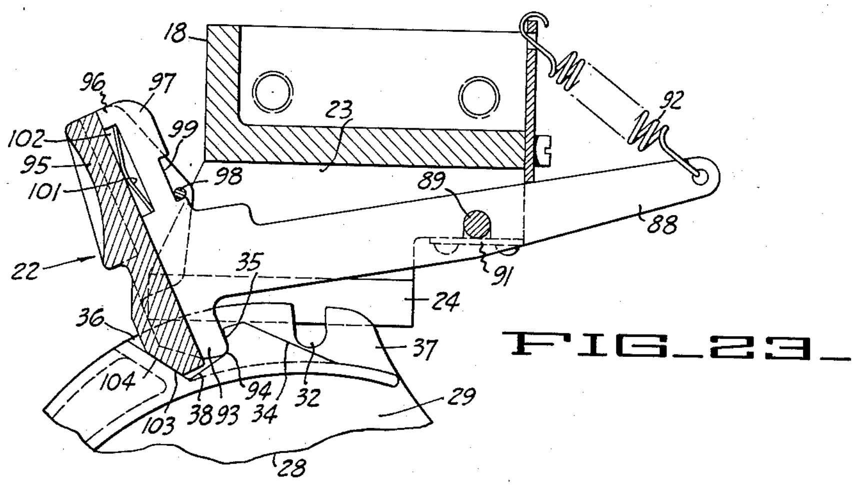
FIGURE 23 is an enlarged view showing the magazine holding lever assembly.

The upper end of the magazine is held by the support 18 and locked in place by the latching mechanism designated generally by the reference numeral 22, shown in detail in FIGURE 23. The support 18 is provided with a plurality of spaced grooves 23. The side members of the magazine straddle the projections 24, and extend into the grooves 23. Operation of the latch assembly to replaceably hold the magazine in the apparatus will be presently described.

The third support member 17 is provided with a plurality of projections 26 which extend outwardly from the support and are adapted to be straddled by the magazine side members. Thus it is seen that the magazines are held in side-by-side relationship by the supports 16, 17 and 18 and the associated grooves and projections formed thereon.

Referring particularly to FIGURES 17–22, a suitable magnetic tape magazine for use in the apparatus is illustrated. The magazine includes side members 27 and 28 which are shaped so that when they are secured together, a pair of reel housings 29 and 31 are formed. The upper and lower ends of the magazine are identical and include the locating notches 32 which are adapted to engage the pins 21 previously described. The ends of the magazines include the plates 37 which are adapted to ride within the grooves 23 formed in the upper support 18. A cam surface 34 is adapted to lift the latch assembly 22 when the magazine is inserted in the apparatus. When the magazine is fully inserted, the holding portion of the latch assembly 22 is accommodated in the notch 36, as will be presently described. The notch includes a shoulder 35 which is engaged by the latch hook and cam surface 38 which, in conjunction with the latch assembly, serves to cam the magazine inward, as will be presently described.

The forward end of the magazine includes a pair of capstan idlers 39 and 41 which rotate on the shafts 42 and 43, respectively, secured to the side members 27 and 28. The magazine includes guide pins 46, 47 and 48 which are adapted to guide the tape in its travel between the reels and past the magnetic heads. The transducing heads operate on the tape as it extends between the reels in the regions 51 and 52. On the front and near the ends of the magazine are formed accommodating grooves 53 and 54 having flat faces 56 and 57. Each of the grooves serves to recive the projecting portions 26 of the support 17 which hold the magazine against lateral movement. The end face of the projections lies opposite the respective face 56 or 57 when the magazine is in place.

The magnetic tape passes over the recesses 58 and 59 in the regions 51 and 52. These recesses are adapted to receive the transducing heads as the tape and heads are brought into cooperative relationship. The sidewalls of the magazine serve to guide the transducing head mounting to align the heads with the magnetic tape.

At the rear portion of the magazine, the side members are provided with a recess 61 including grooves 62 on the sides. When the magazine is assembled, the spaced grooves are adapted to receive and hold a label which identifies the magazine and which may be read with the magazine inserted in the apparatus.

The reels 63 and 64, to be presently described, are rotatably mounted on the shafts 66 and 67 which are suitably held by the side members of the magazine.

Figures 20, 21, 22:
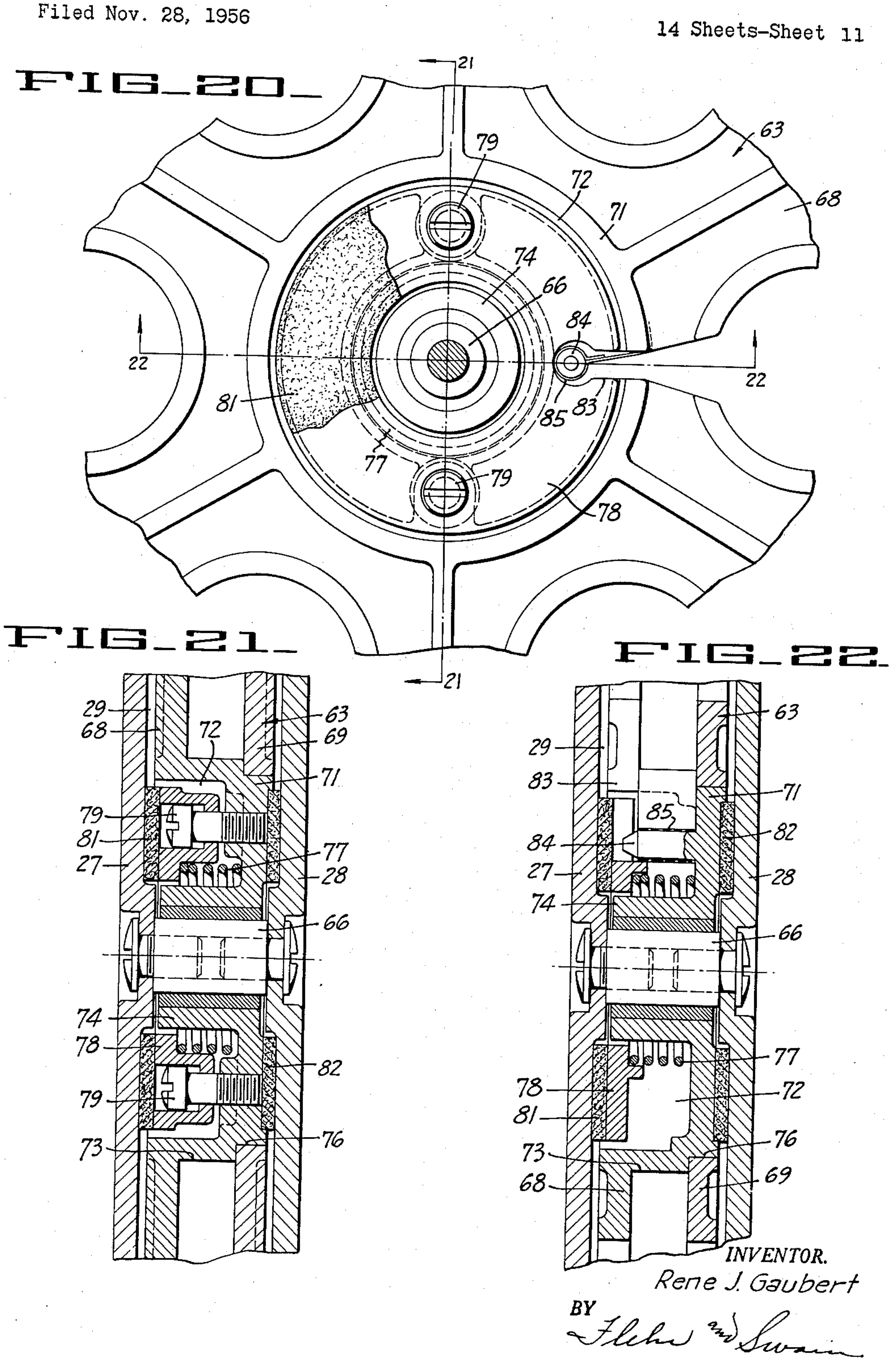
FIGURE 20 is an enlarged view of the reel hub and tape tensioning means.
FIGURE 21 is a sectional view taken along the line 21—21 of FIGURE 20.
FIGURE 22 is a sectional view taken along the line 22—22 of FIGURE 20.

Referring particularly to FIGURES 20–22, the novel reel assembly is shown mounted between the side members 27 and 28. Each of the reels is formed with spaced side plates 68 and 69. The plate 69 is formed with a hub 71 having a circular recess 72. Thus, the hub is U-shaped in section. The outer periphery 73 of the hub is adapted to receive the magnetic tape, while the inside portion 74 is rotatably received by the reel shaft. The side plate 69 is accommodated within the recess 76 formed on the end of the hub and is suitably secured thereto.

A spring 77 is adapted to ride over the inner portion 74 of the hub. A retaining ring 78 serves to hold the spring in the circular recess. Spaced screws 79 engage the bottom surface of the hub and slidably retain the ring. When the reel is mounted between the side members 27 and 28, a pair of washers 81 and 82 made of suitable material, for example, felt, are interposed between the reel and the magazine housing. The spring 77 urges the ring 78 outward, whereby washers 81 and 81 are squeezed between the reels and the side members. This gives rise to a frictional drag on the reel whereby the tape is maintained under suitable tension. The frictional drag is controlled by selecting a spring having a predetermined spring tension.

The end of the tape is inserted through slot 83 cut in the reel and hub and engages the post 84 in the hub opposite the slot. A loop 85 is formed on the end of the tape which serves to engage the post 84.

Thus it is seen that an improved magazine is provided. The magazine provides a frictional drag on the reel whereby the capstan works against a constant tape tension. When the machine is stopped, there is no overrun. The magazine is easily loaded and the tape and tape reels are protected from external damage. The loaded magazine is easily inserted into the apparatus. No threading is required after the magazines are loaded.

In the embodiment shown in FIGURES 17–22, the two ends of the magazine have cut-away portions 86 and 87 which expose the outer periphery of the tape reels. As will be presently described, this provides a clearance for driving the takeup reel and for re-winding the tape following a reproducing or recording operation.

Each of the latch assemblies 22 (FIGURES 1 and 23) includes a lever 88 which is pivoted on the shaft 89. The shaft is held by the plate 91 in the longitudinal groove formed in the support. One end of the lever 88 is engaged by a spring 92 which serves to draw the end upwardly. The opposite end of the lever is provided with a hook portion 93 which is adapted to engage the shoulder 35 formed in the end of the magazine. The spring 92 has sufficient strength to urge the end 94 of the hook downward against the cam surface 38. This serves to cam the magazine inward. A knob 95 is provided with a groove 96 which receives the end portion of the lever. The sides of the knob extend forward over the upward extending portion 97 of the lever. A pin 98 extends therethrough and is accommodated within the slot 99. A U-shaped spring 101 is placed between the knob and lever and is seated in the slot 102. The spring serves to hold the knob in a predetermined position. The knob is adapted to assume an "up" position, allowing the magazine to be urged forwardly under the action of the spring 92; and a "down" position where the surface 103 of the knob rides against the cam surface 104 formed in the magazine and prevents inward movement of the magazine. The purpose of this will presently become apparent.

The magnetic transducing heads, capstan drive, takeup drive means and select mechanism are mounted on a carriage 106 adapted to move transversely across the machine. The carriage is driven by a double threaded lead screw 107 which is journalled to the side frame and frictionally driven from the drive wheel 108.

Figure 5:
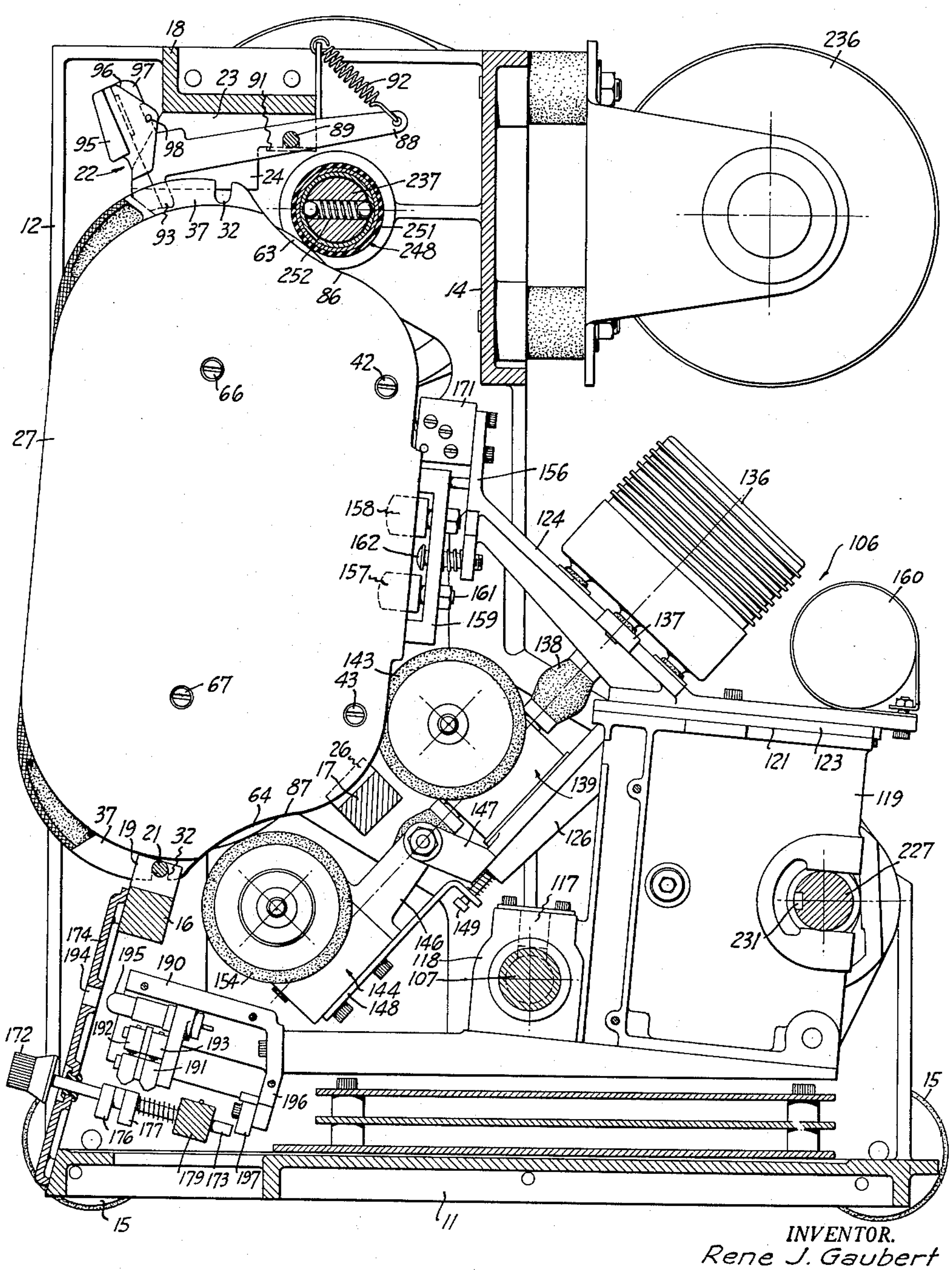
FIGURE 5 is a sectional view taken along the line 5—5 of FIGURE 1A.

The drive wheel assembly includes friction washers 109 and 111 which are engaged by the friction drive collars 112 and 113, respectively. The collars are keyed to the double threaded screw 107 and serve to drive the same. The spring 114 interposed between the drive collar 113 and the collar 116 applies suitable pressure between the members to provide sufficient friction to drive the lead screw 107. The threads of the screw are engaged by a dog 117 (FIGURE 5) which is accommodated within the member 118 which has secured thereto a carriage 106 on which is mounted the magnetic transducing heads, the capstan drive and take-up drive and the select mechanism.

In operation, the carriage 106 is moved transversely across the machine until its assumes a position opposite the next selected magazine, at which time the transverse movement is stopped and suitable means serve to bring the magnetic heads, the capstan drive and the take-up drive into engagement with the tape and reel of the selected magazine. Upon completion of the recording or playback operation, the heads and drives are withdrawn and the lead screw 107 is caused to rotate until the carriage 106 assumes a position opposite the next selected magazine, at which time the cycle of operation is repeated.

Figures 6, 7, 8:
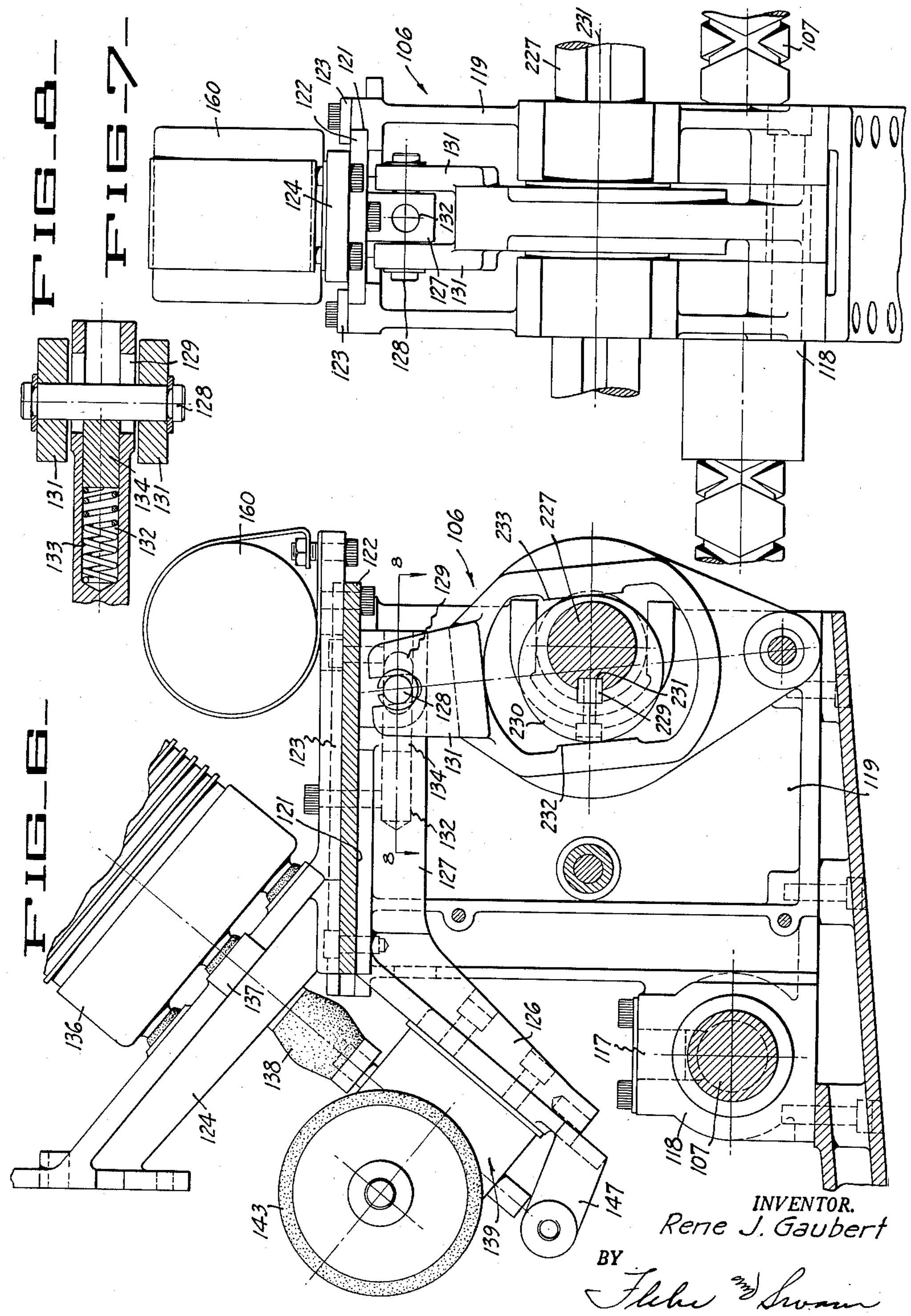
FIGURE 6 is an enlarged side elevational view of the carriage assembly.
FIGURE 7 is a rear view of the carriage assembly of FIGURE 6.
FIGURE 8 is a sectional view taken along the line 8—8 of FIGURE 6.
Figure 11:
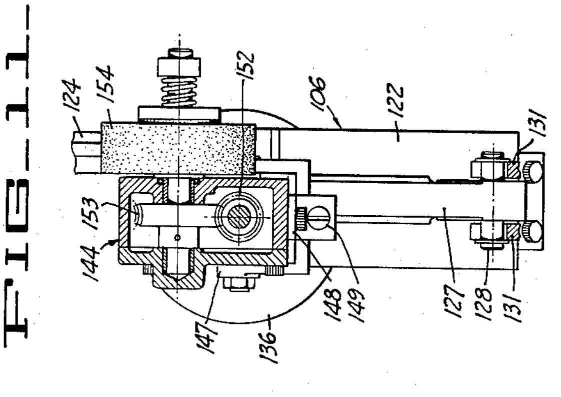
FIGURE 11 is a sectional view taken along the line 11—11 of FIGURE 10.

The carriage includes a frame 119 having spaced side plates. The upper portion of the frame forms a slide 121 for the plate 122 (FIGURE 7). Members 123 are secured to the side members and in conjunction therewith slidably accommodate the plate 122. The bracket 124 serves to support the head assembly and the motive means 136 for the drives and is suitably secured to the plate 122. A second bracket 126 is secured to the plate and serves to mount the capstan and take-up drive assemblies. The bracket 126 includes the portion 127 secured to the plate 122. A pin 128 is accommodated in the elongated opening 129 which is engaged by the spaced arms 131 (FIGURE 8). A spring receiving opening 132 is formed in the portion 127 and serves to seat the spring 133 which urges the plunger 134 outwardly against the pin 128 to urge the pin to the rear of the opening 129. The spring assembly serves to apply a predetermined pressure between the capstan idler and capstan drive rollers and reduce shock to the working parts when the carriage is moved forward to bring the tape into cooperative relationship with the heads and drive, as will be presently described.

Figure 14:
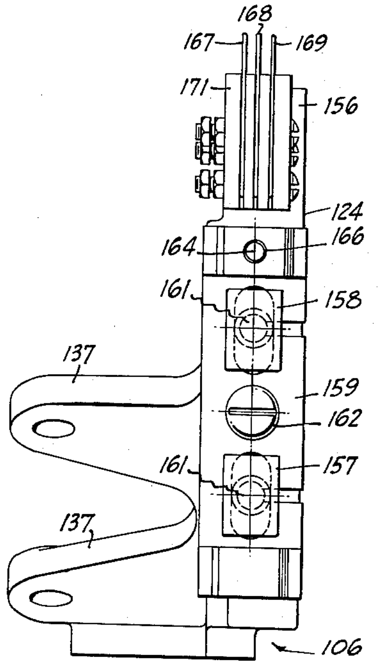
FIGURE 14 is a front elevational view of the magnetic head assembly and mount.

A drive motor 136 is mounted on the outwardly extending mounts 137 of the bracket 124 (FIGURES 6 and 14). The motor shaft extends between the mounts and is engaged by the flexible coupling 138 (as illustrated). The bracket 126 carries the capacitor 160 for the capacitor motor.

Figure 9:
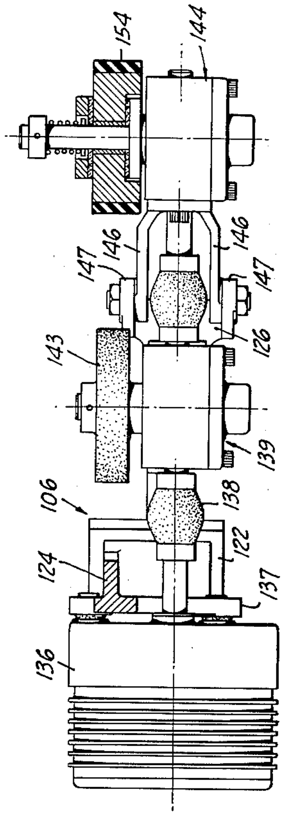
FIGURE 9 is a top view of the capstan drive and take-up drive assembly.
Figure 10:
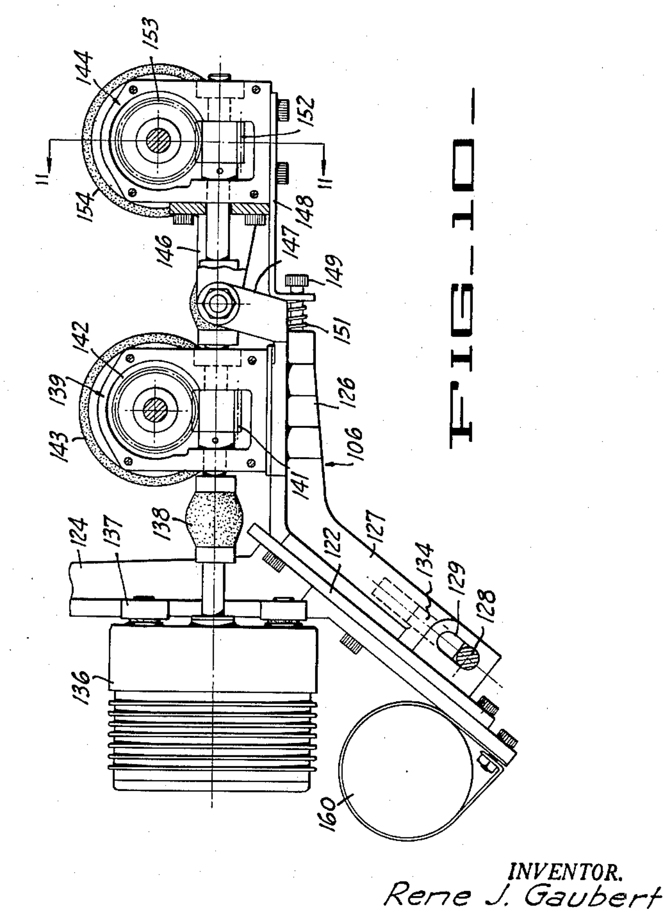
FIGURE 10 is a side elevational view of the capstan drive and tape take-up drive assembly.

The bracket 126 (FIGURE 10) serves to mount a worm drive 139 which includes a worm 141 and worm gear 142. This drive serves to rotate the capstan drive 143. A second worm drive assembly 144 is mounted on the fingers 146 (FIGURE 9) which are pivotally secured to the upwardly extending fingers 147 of the bracket 126. A plate 148 is secured to the bottom of the worm housing and has one end portion bent at right angles thereto and is engaged by the screw 149. A spring 151 serves to urge the member 148 outwardly to pivot the assembly upwardly, as shown in FIGURE 10. The worm assembly is similar to the one previously described and includes a worm 152 and worm gear 153. This assembly serves to drive the take-up drive 154 which is adapted to engage the peripheral edge of the take-up reel, as will be presently described.

Figure 13:
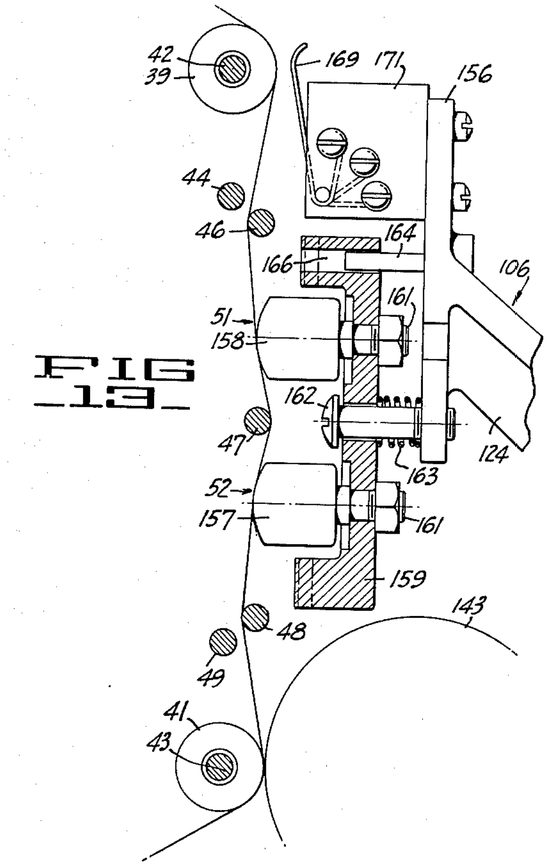
FIGURE 13 is an enlarged side elevational view of the magnetic head assembly and mount.

As previously described, the magnetic transducing head assembly is mounted on the bracket 124. Referring to FIGURE 13, the bracket has a plate-like end 156, which carries the head assembly. Magnetic transducing heads 157 and 158 are suitably mounted to a member 159 as, for example, by means of the screws 161. The member 159 is engaged near the center by a pin 162. The pin is suitably secured to the end 156 of the bracket. A spring 163 is interposed between the end 156 and the member 159 and urges the magnetic heads outwardly. A pin 164 is secured to the plate 156 and extends through the opening 166 formed in the member 159 and serves to prevent rotational movement of the heads, but permits back and forth movement of the heads. There is sufficient play between the hole 166 and pin 164 to allow the head assembly to rotate slightly. Thus it is seen that a floating mount is provided which permits the heads to line up with the magazine and tape.

As illustrated in FIGURE 13, the heads are urged forward by the spring and ride against regions 51 and 52 of the magnetic tape. The capstan drive 143 is shown working in conjunction with the capstan idler 41 to drive the tape past the heads. As will be presently described, selective means are provided for connecting either one or both of the transducing heads to the associated amplifiers.

End of record contact fingers 167, 168, 169 are mounted on the block 71 and serve to engage the tape in the vicinity of the capstan idler 39. By applying a strip of conductive material to the tape at the end of the recording, a preselected pair of the finger contacts may be interconnected to thereby energize the apparatus to retract the magnetic heads and to advance the carriage to the next selected magazine, as will be presently described.

Figures 1B, 12:
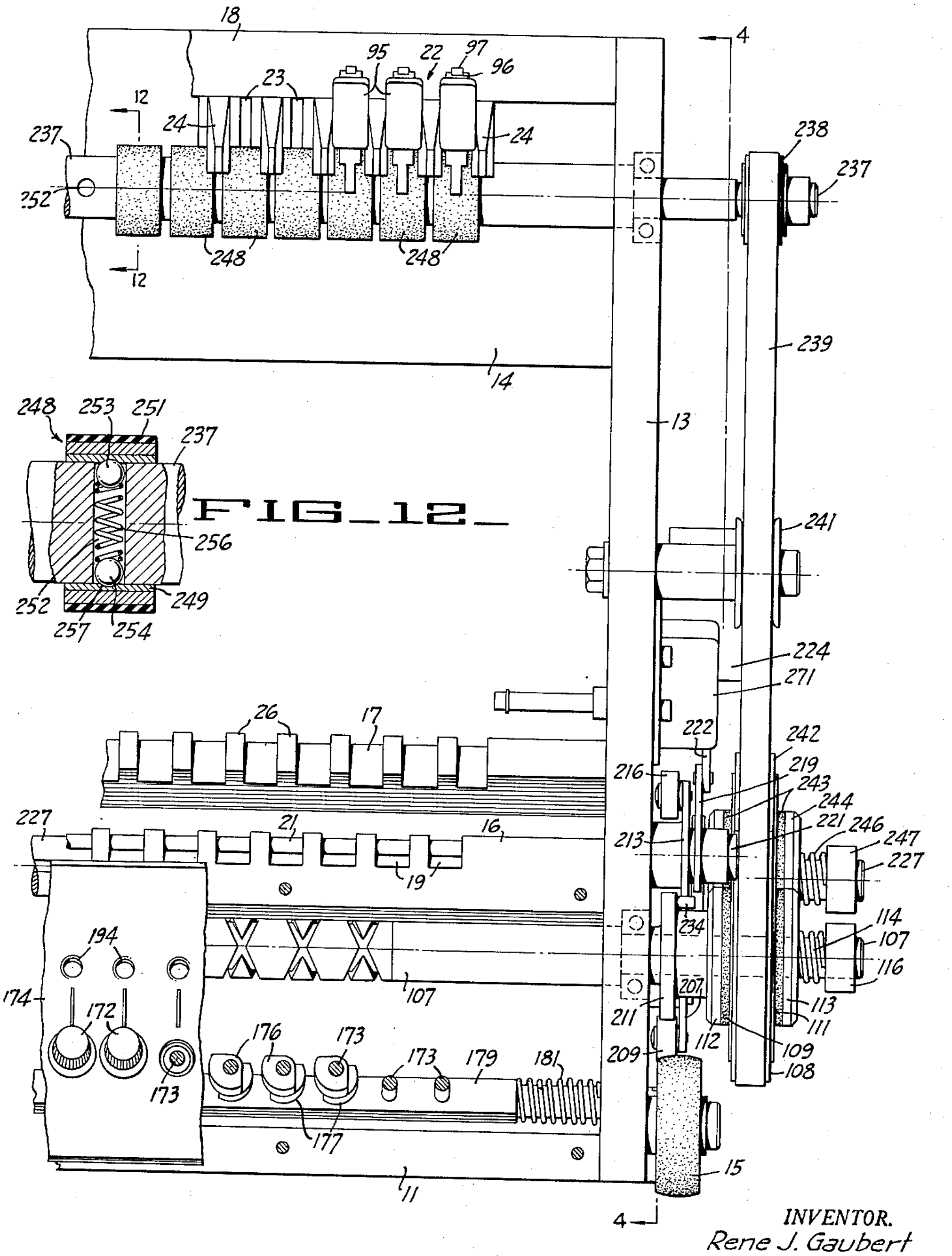
FIGURE 12 is a sectional view taken along the line 12—12 of FIGURE 1B.
Figure 15:
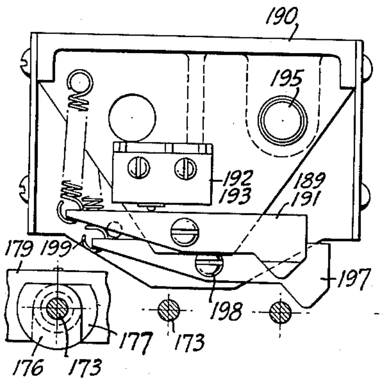
FIGURE 15 is an enlarged front elevational view of the selector mechanism.
Figure 16:
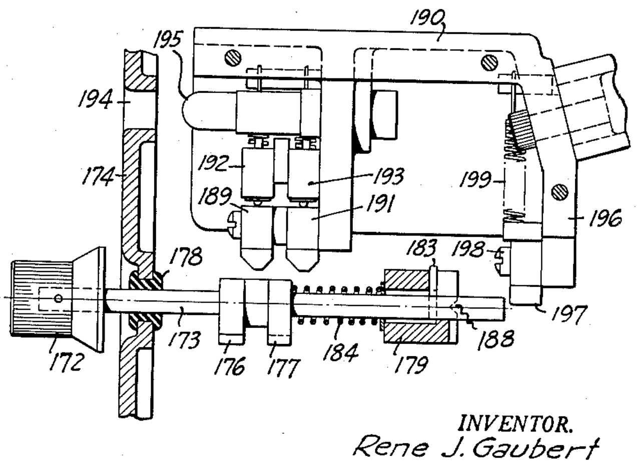
FIGURE 16 is an enlarged side elevational view of the select mechanism.
Figure 17:
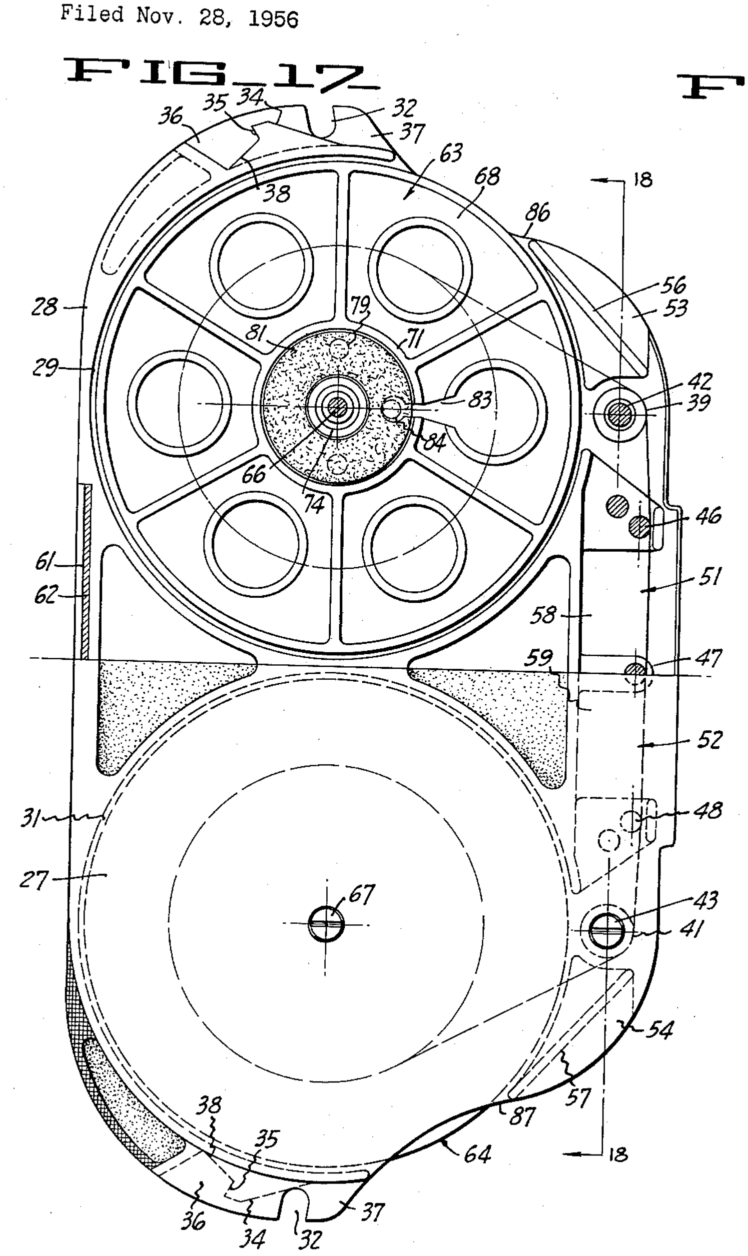
FIGURE 17 is a side elevational view partly in section of a magazine assembly.
Figure 18:
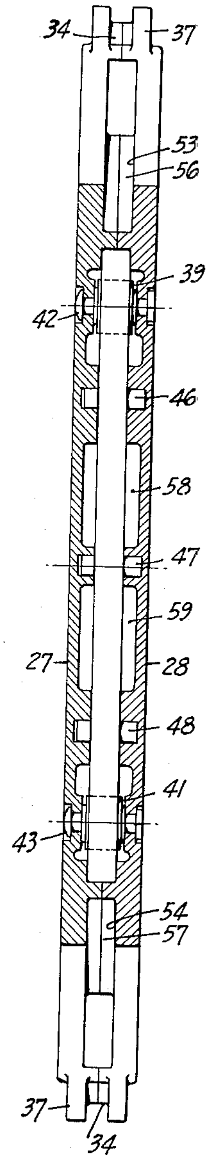
FIGURE 18 is a view of the magazine assembly taken along the line 18—18 of FIGURE 17.
Figure 19:
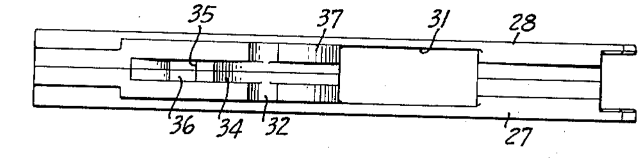
FIGURE 19 is an end elevational view of the magazine assembly.
Figure 31:
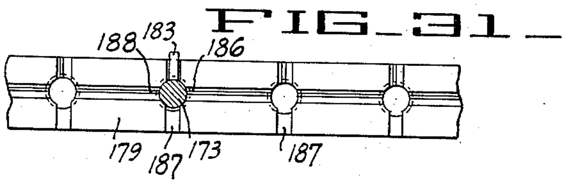
FIGURE 31 is an elevational view showing a portion of the select rod.

The select mechanism provides means whereby preselected ones of the tapes carried by the magazines may be operated upon in sequence. The select mechanism also provides means for operating on either one of two record channels on the magnetic tape or for operating on both channels simultaneously as, for example, for binaural reproduction. Referring to FIGURES 1A—B, the select knobs 172 have shaft 173 which extends through the panel 174 to control the cams 176 and 177. Referring particularly to FIGURE 16, one knob 172 is shown with the shaft. A suitable flexible grommet 178 serves to hold the shaft. The cams 176 and 177 are mounted for rotation with the shaft. The magazine select rod 179 extends laterally across the apparatus and is slidably held by the side members 12 and 13. The right hand end of the rod is spring loaded 181 to urge the rod to the left whereby the shoulder 182 abuts against the side members 12. Each of the shafts 173 associated with the knobs extend through an opening formed in the magazine select rod 179 and are provided with a pin 183 (FIGURE 16). The position of the cams 176 and 177 (FIGURES 1B and 15) may be indexed by rotating the knob and placing the pin in the appropriate groove. In the position shown in FIGURE 16, the shaft is urged to the left by means of the spring 184 mounted between the cam 177 and the rod 179. In this position, as will be presently described, the magazine associated with this knob will not be selected. In order to select the magazine corresponding to the knob, the knob is pushed inward against the tension of the spring 184 and rotated until the pin 183 engages one of the three grooves 186, 187 or 188 (FIGURE 31). When the knob is urged inward and the pin 183 seated in one of the grooves, the cams 176 and 177 lie under the levers 189, 191, respectively, of the switches 192 and 193 which connect the heads to the amplifier. In the position illustrated (FIGURES 15 and 16), the spring urges the shaft 173 outward whereby the respective magazine is not selected. If the knob is urged inward and rotated 90° clockwise, the cam 176 is then in position to engage the switch lever 189 to thereby connect the associated head to the amplifier system. If the knob is turned 180°, both cams 176 and 177 will engage the respective levers 189 and 191 and connect both heads to the amplifying system to operate on both channels. On the other hand, a 270° rotation will bring only the cam 177 in line with the lever 191, thereby connecting the associated head with the amplifier.

Thus it is seen that to select a magazine and operate on one or the other of the channels, or both, the knob 172 is urged inwardly and rotated to the proper position.

The switches and lever are mounted on the member 190 which is suitably attached to the members 118, 119. An indicating light 195 is also carried by the switch assembly and serves to indicate the magazine which is being played by illuminating the openings 194 formed in the panel 174. As is apparent, the member 190 with the switches and levers moves with the carriage 106 as it moves transversely across the apparatus. Mounted on the lower portion 196 of the member 190 is a trip member 197 which is adapted to abut against the shaft 173 when the knob has been set to select a particular magazine. It is apparent that if there is no selection the member 197 clears the shaft. When the member 197 abuts the shaft 173, the magazine select rod 179 is moved to the right and serves to actuate the magazine select mechanism to be presently described. When the recording or play-back operation is completed and the contacts 167 and 169 engage, the conductive strip mounted on the magnetic tape, the heads are retracted and the carriage will move to the next selected magazine. The member 197 is pivoted on the screw 198 and is spring-loaded 199 whereby it rotates to move past the shaft 173.

Figure 4:
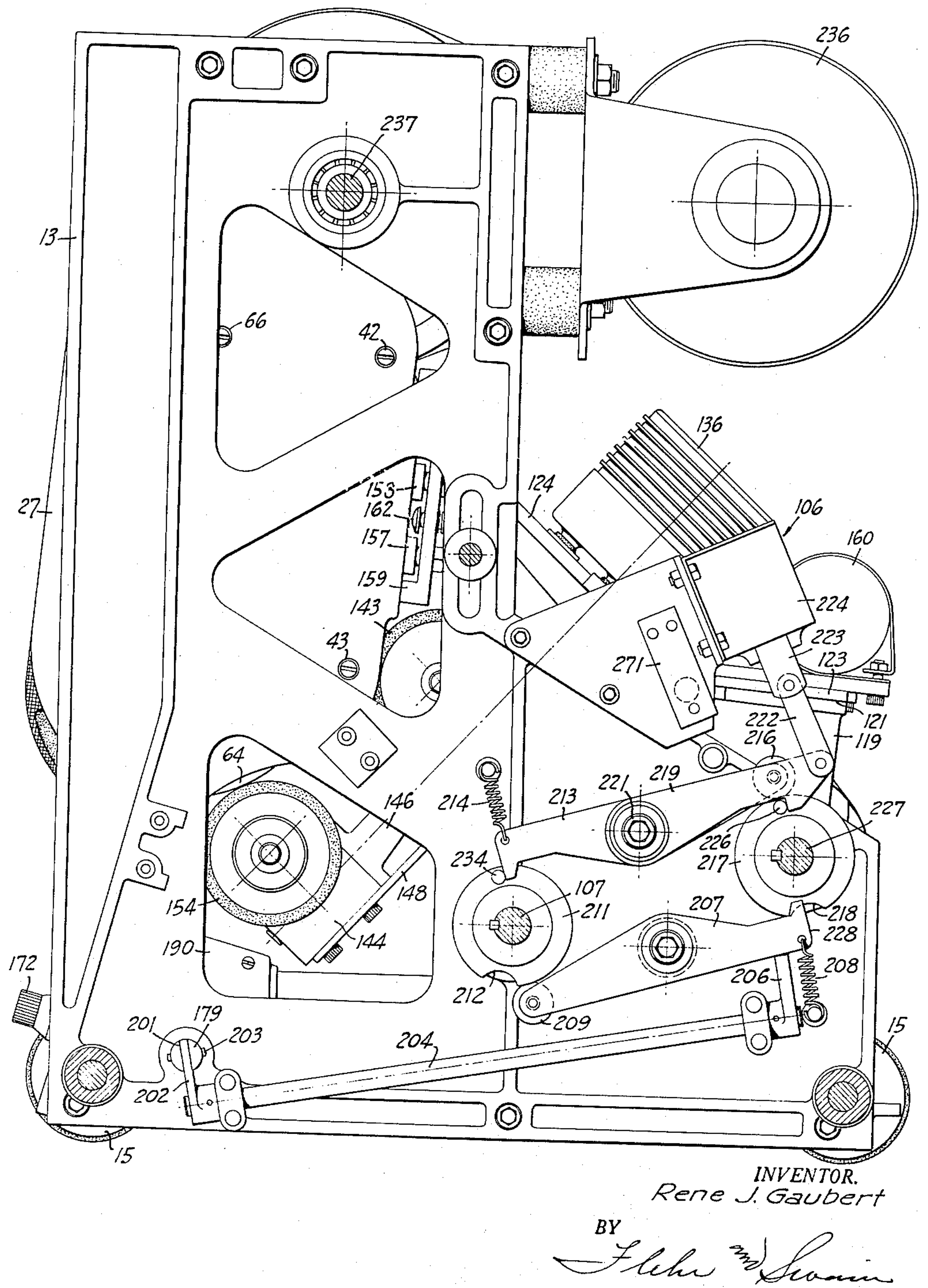
FIGURE 4 is a side elevational view partly in section taken along the line 4—4 of FIGURE 1B.

The action of the rod 179 to actuate the magazine select mechanism is more clearly understood with reference to FIGURE 4. The rod 179 extends through the side member 13. The slot 201 accommodates the lever 202 which is pivotally secured thereto by means of a pin 203. When the rod 179 is urged to the right, it moves the lever 202 outwardly to rotate the shaft 204. On the other end of the shaft 204, a locking lever 206 serves to lock the lower trip lever 207. When the rod is urged outwardly, the lever 206 rotates to free the lever 207, whereby the spring 208 may pull the trip lever 207 downwardly. The opposite end of the lever 207 is provided with a roller 209 which rolls on the cam 211. The lever can only be pulled downwardly by the spring 208 when the roller 209 lies opposite the indentation 212 formed in the cam. An upper trip lever 213 has one end pulled upwardly by a spring 214 and its opposite end carries a roller 216 which rides on the cam 217. Here, again the spring 214 can only act to rotate the lever 213 when the cam 217 is rotated until the indentation 218 under the roller 216. A trip lever 219 is pivotally mounted on the pin 221. The opposite end of the lever 219 is engaged by link 222 which is connected to the armature 223 of the solenoid 224. The solenoid 224 is connected to a suitable power source and is energized when a pair of contacts 167—169 are interconnected by the end of record conductive strip. When the solenoid is energized, the lever 219 is lifted whereby the pin 226 is released and the eccentric drive shaft 227 and cam 217 rotate through 180° at which time the pin 226 abuts against the shoulder 228 of the lever 207. Rotation of the shaft 227 is then stopped until the lever 207 is rotated to free the pin, that is, when the roller 209 lies opposite the indentation 212, and the lever is rotated. The pin 226 is then released and the cam 217 and shaft 227 are rotated through a second 180°, at which time the pin 226 is again engaged by the trip lever 219. As will be presently described, the solenoid is only energized for a short time when the fingers 167—169 engage the conductive strip. As soon as the mechanism is energized, and the shaft 227 rotates, the fingers are withdrawn and the solenoid is deenergized, whereby the trip lever is lowered into position to engage the pin as the cam 217 rotates through the second 180°.

Assuming that a recording is nearing its completion, operation of the magazine select mechanism is as follows: When the end of the recording is reached, the fingers 167—169 contact the conductive strip and energize the solenoid 224. Preferably, the contacts are connected to a power relay which controls the power to the solenoid 224. When the solenoid 224 is energized, the lever 219 is lifted whereby the cam 217 and shaft 227 may rotate through a first half a revolution, as previously described. Referring to FIGURE 6 the shaft 227 is shown. An eccentric 230 is slidably mounted thereon and includes a key 229 which engages a keyway 231 formed on the shaft 227. The eccentric and shaft are shown in the position assumed when the magnetic tape is being operated upon. When the end of the tape is reached, the shaft 227 is rotated through half a revolution, as previously described, and the action of the eccentric against the surfaces 232, 233 of the arms 131 serves to rotate the arms clockwise whereby the magnetic head assembly and the capstan and take-up drive assembly are moved rearwardly, retracting the heads from the magazine and disengaging the drives to thereby clear the magazines. Rotation of the shaft 227 is stopped at the end of the first half a revolution when the pin 226 abuts the shoulder 228 as previously described. However, the double threaded lead screw 107 continues to rotate since in this position the depression 218 on the cam 217 lies opposite the roller 216 whereby the lever 213 is rotated to allow the cam 211 to rotate without the pin 234 abutting the lever 213. The lead screw 107 continues to rotate, moving the carriage transversely across the machine, until the abutting member 197 strikes rod 173 of the next selected magazine. At this time, the lever 202 is urged outwardly, rotating the shaft 204 and removing the stop 206 from beneath the lever 207. The lead screw 107 continues to rotate to bring the depression 212 opposite the roller 209. The lever 207 is then rotated releasing the pin 226. When the pin 226 is is released, the cam 217 and shaft 227 rotate and urge the roller 216 upward out of the depression 218 thereby rotating the lever 213 in line to stop rotation of the lead screw 107 when the pin 234 strikes the lever 213.

When the lead screw 107 rotates to urge the roller out of the indentation 212, the lever 207 is rotated whereby the locking lever 206 may move under the lever 207 and lock the same. The locking lever 206 is rotated by the action of the spring 181 against the select rod 179.

Rotation of the shaft 227 through the second 180° rotates the eccentric 230 to urge the arms 131 in a counterclockwise direction which brings the transducing heads and the capstan and take-up drives into engagement with the tape and reel of the magazine.

The apparatus is driven by suitable motive means. For example, an electric motor 236 may be mounted on the cross frame 14. As illustrated the motor drives the re-wind shaft 237. The opposite end of the re-wind shaft extends beyond the side member 13 and has a pulley 238 mounted thereon. A suitable belt 239 extends over the pulley 238 and engages the idler pulley 241, the eccentric drive shaft pulley 242, and the double threaded screw drive wheel 108.

Referring particularly to FIGURE 1B, the eccentric drive shaft is frictionally driven from the wheel 242. Thus, the wheel includes drive collars 244 splined to the shaft 227 and the drive washers 243 which frictionally engage the collars and wheel. The spring 246 which is compressed between the drive collars 244 and the collar 247 serve to provide proper frictional force to the friction drive.

Referring to FIGURES 1B and 12, the re-wind shaft 237 carries a plurality of rollers 248. These rollers are shown in detail in FIGURE 12 and include a bushing 249 and a resilient drive surface 251. The shaft 237 is provided with holes 252 extending therethrough, a pair of spring loaded balls 253 and 254, having a spring 256 therebetween and serving to urge the balls outwardly, and engage the bushing 249. A groove 257 is formed in the inner surface of the bushing and has the general contour of the balls. Engagement of the groove by the balls prevents axial movement of the friction re-wind rollers. A drive roller 248 is provided for each of the magazines, and as will be presently described, these drives serve to provide a re-wind torque to the periphery of the supply reel whereby the magnetic tape may be rewound upon the supply reel upon completion of a recording or reproducing operation if desired.

Figure 24:
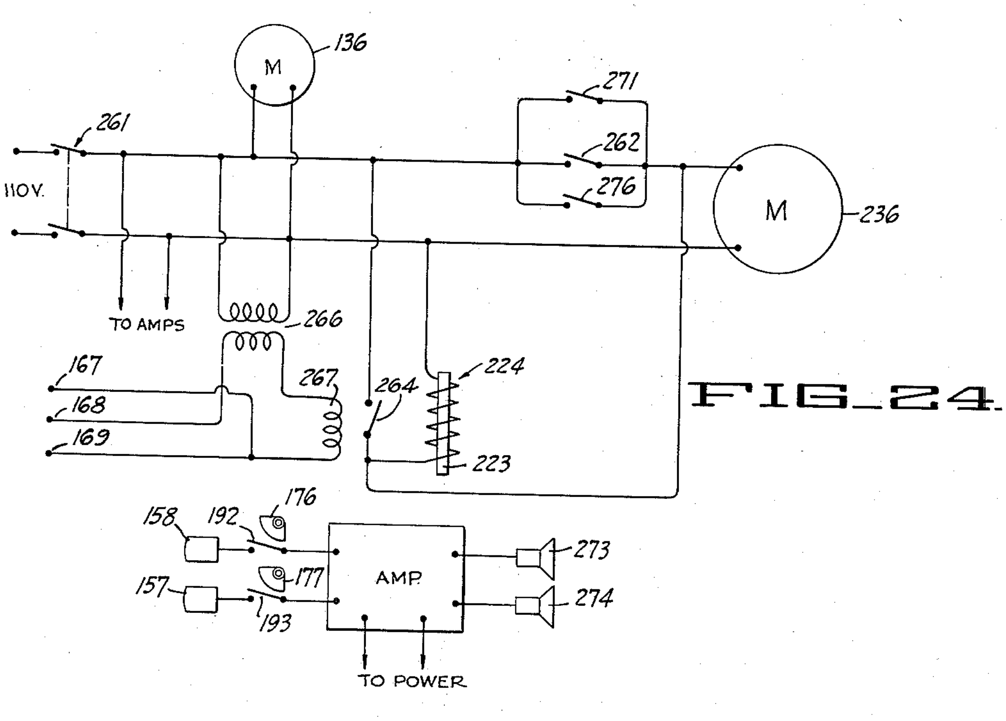
FIGURE 24 is a circuit diagram of the electrical portions of the magnetic tape apparatus.

Referring to FIGURE 24, a schematic electrical circuit diagram for the apparatus is shown. The motor 236 is connected to a voltage supply through switch 261. A hold switch 262 is interposed between the switch 261 and the motor. The hold switch 262 is mounted on the side member 12 and is actuated by the cam 263 carried on the corresponding end of the shaft 227. Energization of the solenoid 224 from the power lines is controlled by the contact 264 of the power relay. A transformer 266 is connected between the central end of contact finger 168 and one side of the power relay winding 267. The other side of the winding 267 is connected to the contacts 167 and 169. When the shorting strip attached to the magnetic tape at the end of the recording connects either pair of contacts 167, 168 or 168, 169, power is supplied to the winding 267. This closes the relay contact 264 to energize the solenoid 224. As previously described, when the solenoid 224 is energized, the heads are retracted and the finger contacts are brought out of engagement with the tape. This serves to de-energize the power relay to open the contact 264 and de-energize the solenoid 224.

Assuming that the hold switch 262 is open when the magnetic tape is being operated upon, then when the relay contact 264 is closed, the motor is instantaneously energized and begins to rotate, thereby rotating the shaft 227 to withdraw the heads and drives. If the cam 263 is properly located, the instant that the motor starts to rotate for a small angle the cam closes the hold switch 262, thereby maintaining the motor energized until the eccentric shaft is again rotated to lower the head, at which time the hold switch 262 is opened and the motor turned off.

In this cycle of operation, it is observed that the motor only operates while the carriage is moved transversely from one magazine to another and that the motor is de-energized when the magnetic heads engage the tape. In order to re-wind the tape on the supply reels of the various magazines, it is, therefore, necessary to provide a switch 271 which is mounted on the side member 13. The switch includes a plunger which extends inwardly to be engaged by the carriage when it reaches the limit of travel to the right in the figure. The switch 271 is closed and remains closed while the last magazine is being operated upon. This serves to drive the re-wind shaft 237 to rewind the tape upon the supply reels of all of the other magazines. Upon completion of the operation on the last tape the carriage moves to the left. The switch 271 is preferably a delay switch which serves ot keep the motor energized for a predetermined time which is sufficient to rewind the tape on the supply reel of the last magazine. It is, of course, apparent that if the switch 276 is closed, the motor will continuously run and continuously provide a rewind torque to the supply reels of the various magazines as the heads are operating on a magnetic tape thereby rewinding the tape immediately following an opereation thereon and while the next selectiton is being operated upon. The tape is then in readiness for another operation after the following selection is terminated.

In certain circumstances, it is desirable to leave the machine energized and yet not have the motor running at all times. For example, this would be important in a coin-operated machine employed in places of entertainment. In such event the foregoing switching system is desirable.

The cams 176 and 177, which operate the switches 192 and 193 respectively, through the levers are schematically illustrated in the figure. The switches are shown connecting the magnetic heads 158, 157 to a suitable dual channel amplifier. The output of the amplifier is fed to a pair of speakers 273, 274.

The supply line is connected to continuously energize the capstan and take-up drive motor 136.

Operation of the complete apparatus is as follows: The tape magazines are inserted into the apparatus and latched in place by the latching assembly 22. Assuming that the magnetic tape carried by each of the magazines carry two record tracks, then the select knobs are rotated whereby either the head operating on the right hand, left hand, or both tracks is connected to the amplifier. As many of the selections as desired may be selected to be played in sequence. Magazines may be moved from one slot to another to give the desired sequence of reproduction.

The machine is then energized and the carriage moves to the right until the trip member 197 strikes the rod 173 of the first selected magazine. At this time, the magazine select mechanism is energized, which causes the movement of the carriage to terminate and which then moves the heads, capstan drive and take-up assembly forward to engage the magnetic tape of the magazine. The capstan drive engages the lower capstan idler and the pressure serves to pivot the magazine on the pin 21. The upper end of the magazine abuts against the hooklike lever portion 94 and brings the spring 92 under tension. The peripheral edges of the supply reel are brought out of engagement with the associated re-wind roller. Constant tension is maintained on the tape by the action of the friction washers in the reel and magazine assembly. Simultaneously, the take-up reel drive roller engages the periphery of the take-up reel and rotates the same to wind the tape thereon as it is fed past the magnetic heads by the capstan drive.

Figures 25, 26:
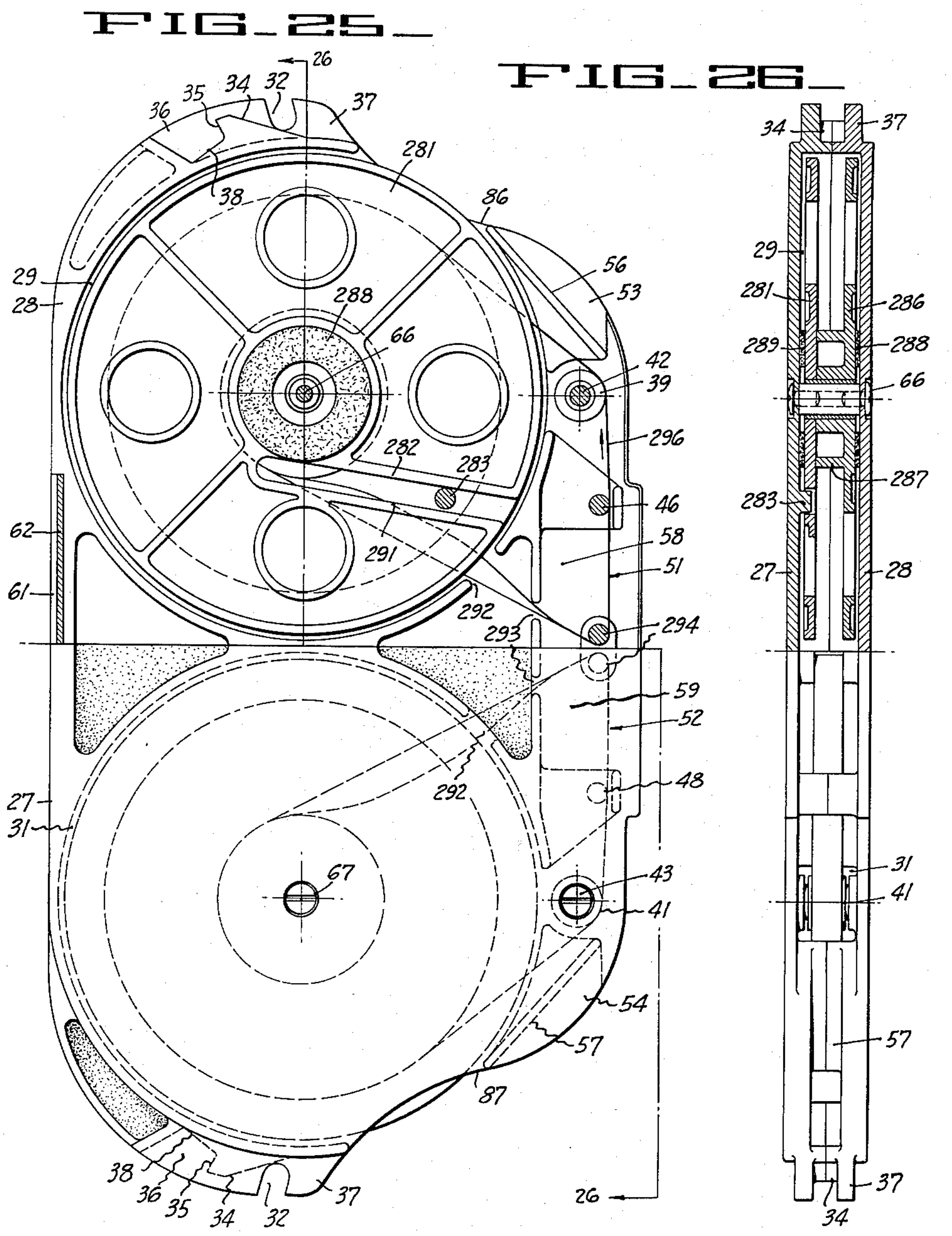
FIGURE 25 is a side elevational view of another embodiment of the tape magazine.
FIGURE 26 is a sectional view taken along the line 26—26 of FIGURE 25.

At the end of the recording, the conductive strip associated with the particular channel will contact a pair of the finger contacts 167, 168, 169, at which time the relay coil 267 is energized to close the contacts 264 and actuate the solenoid armature 223. The magazine select mechanism is released to rotate the eccentric drive shaft. The magnetic heads, the capstan drive and the take-up reel drive are withdrawn. Simultaneously, the magazine is rotated inward by the action of the hook surface 94 against the cam surface 38 (FIGURE 25). At this time, the supply reel engages the re-wind roller and the tape is rewound on the magazine. If it is not desired to rewind the tape, the knob 95 is urged downwardly whereby the surfaces 103 and 104 are engaged, thereby holding the magazine outward to prevent contact of the re-wind rollers with the peripheral edge of the supply reel.

The carriage moves to the right by the action of the double threaded lead screw until the abutment 197 strikes the rod 173 of the next selected magazine. The carriage is indexed and the motion of the select screw is stopped. The eccentric shaft rotates through half a revolution to bring the heads, capstan drive and take-up reel assembly forward to engage the tape and operate on the next recording. The particular right hand, left hand, or both recordings are selected by adjusting the position of the knob 172 to one of the three predetermined positions, whereby either one of the cams 176, 177 or both operate the switches 192, 193 to connect the desired head to the amplifier system.

In instances where it is desired not to have the motor 236 operate continuously, the switch 276 is opened. In this instance, when the finger contacts are shorted, the motor is instantaneously energized and starts to rotate, at which time the cam closes the hold switch 262 and the motor continuously rotates until the next selected magazine is selected, at which time the hold switch 262 opens. To provide sufficient time for the tapes to rewind, the last magazine should be played, at which time the switch 271 remains closed and the motor continues to be energized as the tape is being operated upon. When this selection is completed and the carriage moves to the left, the time delay keeps the motor rotating for a predetermined time which is sufficient to rewind the tape of the last selection.

In certain instances, the two channel recordings are recorded in opposite direction, whereby it is desirable to operate on the tape in one direction and then to operate on the same in the other direction without rewinding. In such instances, the action of the latch assembly to prevent inward movement of the magazine is desirable. The knob associated with these magazines is moved downwardly thereby preventing rewinding of the same. In order to play the other selection, the magazine is removed and rotated through 180° and inserted back into the apparatus. Adjustment of the associated switch 172 is not necessary since the new recording will be on the same side because of the reversal of the magazine.

Another embodiment of the magnetic tape magazine is shown in FIGURES 25 and 26. The magnetic tape magazine illustrated accommodates a pair of reels each of which has a continuous tape wound thereon. The side members, positioning notches, etc., are identical with those previously described and carry like reference characters. The construction of the reel is modified. The upper reel disk 281 has a groove 282 formed therein. A locking pin 283 extends downwardly from the side member 27 and engages the slot 282 to prevent rotation of the reel disk 281. The other reel disk 286 is provided with a hub 287 upon which the magnetic tape is wound. The hub and disk are free to rotate. Suitable spacers 288 and 289 are provided between the reel assembly and the side members. The continuous magnetic tape is wound upon the reel with the central turn adjacent the hub extending outwardly through the slot 282 formed in the fixed disk. The tape folds over the edge 291 of the slot 282 and travels in the space between the disk 281 and the side member 27 outwardly through the slot 292 formed in the housing. The tape then passes through the slot 293 where it is turned through 90° and passes over the pin 294. The tape then travels over the pin 46 and the capstan idler 39 and is wound on the reel. In playing, the direction of tape travel is as indicated by the arrow 296; that is, the tape is unwound from the center and is re-wound on the outside of the reel.

When employing a magnetic tape magazine of the character described, the re-wind means of the apparatus described may be disabled, the apparatus may be constructed without re-wind means, or the knobs 95 are lowered to lock the magazine outward where the rewind collar 248 does not engage the reel. The lower magnetic head operates in the region 52 of the associated tape, and the capstan drive and the take-up reel drive are identical with those previously described and serve to transport the tape past the magnetic head where it is operated upon. In order to operate upon the tape on the other reel, the magazine is removed from the apparatus and rotated 180° and re-inserted into the apparatus. In all other respects the machine operates as previously described.

In places of entertainment and the like, it may be desirable to modify the apparatus whereby it may be coin operated. Referring to FIGURES 27–30, a portion of the apparatus showing the necessary modifications is illustrated. A plurality of coin chutes 301 are provided, one for each of the magazines. The select rod 179 is formed whereby it includes a plurality of grooves 302, one adjacent each of the coin chutes. The switching mechanism is removed and the electrical circuit is modified accordingly. To select a particular magazine, a coin is inserted in the chute and drops downwardly until its lowermost portion engages the slot or groove 302. The mounting member 190 is modified and a lug 303 is attached thereto. As the next carriage moves transversely of the apparatus toward the next selected magazine, the lug 303 engages the coin of the next selected magazine and moves the select rod 179 to the right. The select mechanism is operated, as previously described, to stop transverse movement of the carriage. The player head, capstan drive and take-up reel drive are advanced into engagement with the magazine and the magnetic tape operated upon. Upon completion of the operation the carriage assembly is moved rearwardly and advanced to the next selection, also as previously described.

Figures 27, 28, 29, 30:
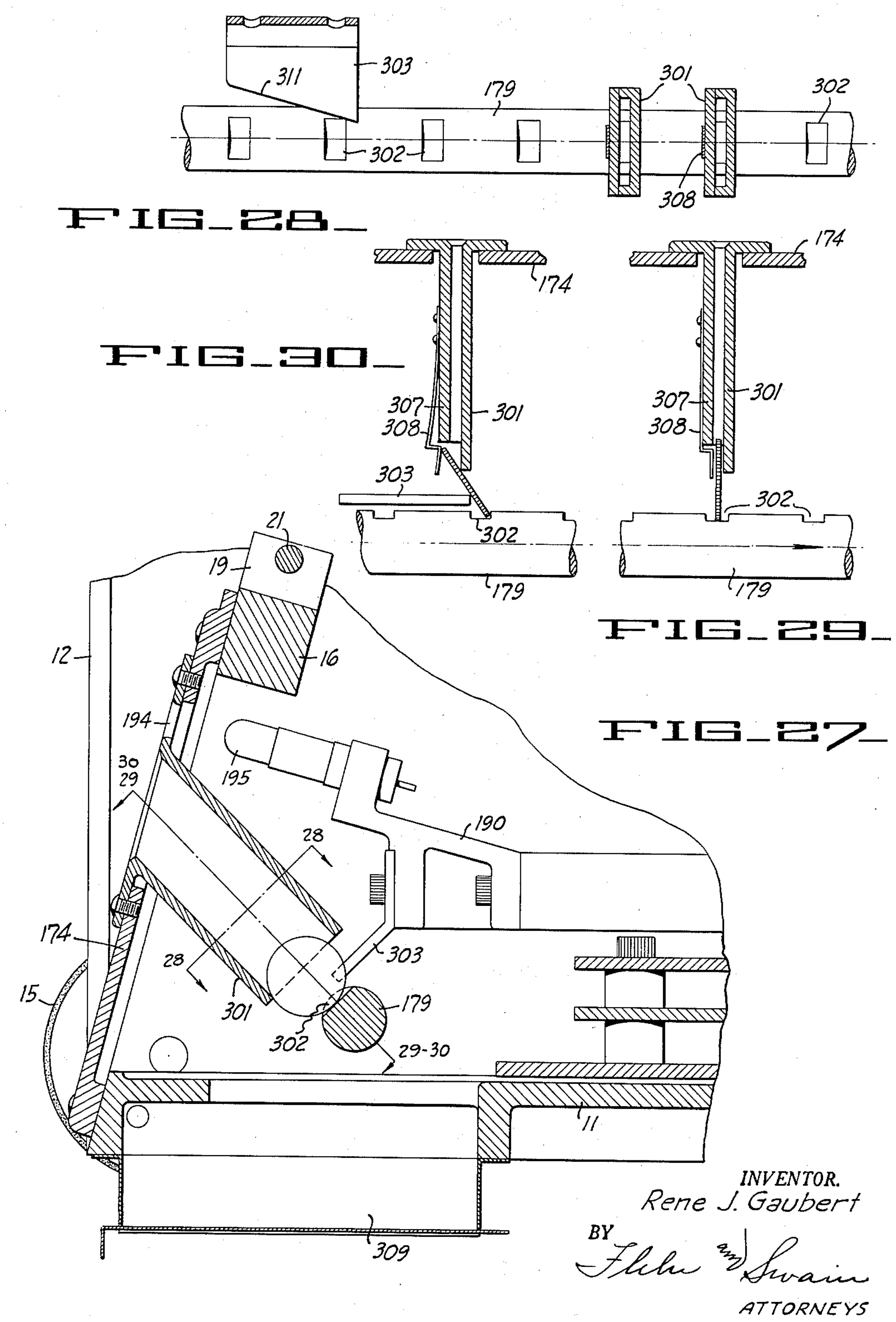
FIGURE 27 is a side elevational view of a portion of another embodiment of the magnetic tape apparatus showing a coin-operated select mechanism.
FIGURE 28 is a view taken along the line 28—28 of FIGURE 27.
FIGURES 29 and 30 show the select mechanism in operation.

As illustrated in FIGURE 30, the coin is tilted over whereby it clears the side 307 of the coin chute and has its upper edge in engagement with the spring 308. Travel of the carriage to the next selection upon completion of a selection further tilts the coin whereby it is disengaged and falls downwardly into the coin tray 309.

Selections may be made subsequent to the playing of a recording and the lug 303, on its backward travel, will merely cam the coins upward into the chute by the action of the inclined surface 311. Forward travel will then act on the coin to activate the select assembly.

It is, of course, apparent that by employing magnetic tape magazines of the type described, threading is eliminated. As a result, apparatus can be constructed in which the capstan drive, transducing means and take-up means are fixed. When the magazine is inserted into the apparatus, the capstan drive, transducing means and take-up means are brought into cooperative relationship with the magazine and tape. Upon completion of the recording or playback operation, the magazine may be removed and the next magazine inserted into the apparatus. If it is desired to rewind, rewind means may be included in the apparatus. The magazine which has been operated upon may be placed into the apparatus to bring the rewind means into cooperative relationship with the supply reel. The magnetic tape apparatus described can be easily modified to be manually operated. Preferably, the magazine engages with a pivot pin and is rotated into place, as previously described. Suitable latching means of the type described will serve to releasably hold the magazine in the apparatus.

Thus it is seen that I have provided an improved magnetic tape apparatus which is suitable for playing a plurality of recordings in a pre-selected manner. Novel magazines are employed to hold the tape. The magazines are easily inserted into the apparatus where the magazines are automatically selected and the tape is operated upon.

I claim:

1. A magnetic tape apparatus comprising a plurality of magnetic tape magazines each serving to carry magnetic tape, a carriage transducing means adapted to operate on said tape mounted on said carriage, means for driving the tape past the transducing means mounted on said carriage, and means for moving the carriage to bring the transducing and driving means into cooperative relationship with the tape whereby the tape is driven past the transducing means.

2. A magnetic tape apparatus comprising a plurality of magnetic tape magazines placed in side-by-side relationship, a carriage, and each serving to carry magnetic tape, transducing means adapted to operate on said tape mounted on said carriage, means for driving the tape past the transducing means mounted on said carriage, means for moving said carriage transversely of said magazines, and means for selectively advancing the transducing and driving means into cooperative relationship with a magazine whereby the tape is driven past the transducing means.

3. Apparatus as in claim 2 including means serving to hold the magazines in side-by-side relationship.

4. A magnetic tape apparatus comprising a plurality of magnetic tape magazines each serving to carry magnetic tape, means for holding said magazines in side-by-side relationship in said apparatus, a carriage transducing means adapted to operate on said tape mounted on said carriage, means for driving the tape past the transducing means mounted on said carriage, means for moving the carriage transversely of said magazines, and means for advancing the transducing and driving means conjointly into cooperative relationship with a magazine whereby the tape is driven past the transducing means.

5. A magnetic tape apparatus comprising a plurality of magnetic tape magazines each including supply and take-up reels and serving to carry magnetic tape on the same, a carriage transducing means adapted to operate on said tape, means for driving the tape past the transducing means, and means for driving the take-up reel to wind the tape upon the same all mounted on said carriage following an operation on the same, and means for advancing the transducing, driving and take-up means into cooperative relationship with the magazine whereby the magnetic tape is driven past the transducing means and wound upon the take-up reel.

6. A magnetic tape apparatus comprising a plurality of magnetic tape magazines each including supply and take-up reels and serving to carry magnetic tape, a carriage, transducing means adapted to operate on the tape in a region between the reels, means for driving the tape past the transducing means, and means for driving the take-up reel to wind the tape thereon all mounted on the carriage, means serving to engage the supply reel and rewind the tape upon the same following an operation on said magnetic tape, and means for selectively advancing the transducing means and the tape and supply reel driving means into cooperative relationship with a magazine whereby the tape is driven past the transducing means and wound upon the take-up reel.

7. Apparatus as in claim 6 wherein said magazine is mounted to pivot about one end whereby when the transducing and driving means are brought into cooperative relationship with the magazine the rewind means is brought out of cooperative relationship with the supply reel.

8. A magnetic tape apparatus comprising a plurality of magnetic tape magazines held in side-by-side relationship, each of said magazines including supply and take-up reels serving to carry magnetic tape, a carriage, transducing means adapted to operate on the tape in the region between the reels, means for driving the tape past the transducing means, and means for driving the take-up reel to wind the tape thereon following operation on the same all mounted on said carriage, means for moving said carriage transversely of said magazines, means for selectively advancing the transducing and driving means conjointly into cooperative relationship with the magazines whereby the tape is driven past the transducing means and wound upon the take-up reel.

9. Apparatus as in claim 8 together with means serving to engage the supply reel and to re-wind the tape upon the same following an operation on the magnetic tape.

10. Apparatus as in claim 9 wherein said magazine is mounted to pivot about one end whereby when the transducing and driving means are brought into cooperative relationship with the magazines the re-wind means is disengaged from the supply reel.

11. Magnetic tape apparatus comprising a plurality of magnetic tape magazines each serving to carry a magnetic tape, means for holding said magazines in side-by-side relationship in the apparatus, transducing means adapted to operate on the tape, means for driving the tape past the transducing means, a carriage serving to carry said transducing and driving means, means for moving said carriage transversely of said magazines, means for selectively stopping the transverse movement of the carriage and means for advancing the carriage whereby said transducing and driving means are brought into cooperative relationship with the selected magazines to drive the tape past the transducing means and to operate on the same.

12. Apparatus as in claim 11 including a lead screw serving to drive said carriage transversely of the apparatus, means for selectively stopping said lead screw when the carriage is opposite a preselected magazine, and means engaging said carriage and serving to selectively advance the same.

13. Apparatus as in claim 12 including a means for retracting said carriage upon completion of an operation on the magnetic tape.

14. A magnetic tape apparatus comprising a plurality of magnetic tape magazines each serving to carry magnetic tape, means for holding said magazines in side-by-side relationship in said apparatus, transducing means adapted to operate on said tape, means for driving the tape past the transducing means, a carriage serving to carry said transducing and drive means, a lead screw serving to drive said carriage transversely of the apparatus, means associated with said carriage and serving to advance and retract the same, a drive shaft serving to operate said advancing and retracting means, a select mechanism serving to release said drive shaft upon completion of an operation on the tape to permit the same to rotate through 180° whereby the carriage is retracted to withdraw the transducing and drive means, serving to release the lead screw whereby the same continuously rotates, serving to stop rotation of the lead screw when the carriage has moved transversely opposite the next selected magazine, and serving to release the drive shaft to permit the same to rotate through another 180° whereby the carriage is advanced to bring the transducing and drive means into cooperative relationship with the magazine.

15. Apparatus as in claim 14 wherein said select mechanism includes cams carried by said lead screw and said drive shaft, and a pair of levers adapted to operate on said cams and serving to selectively lock and release the lead screw and drive shaft.

16. Apparatus as in claim 15 including a select rod extending across the apparatus and adapted to be urged outwardly by the carriage when the same travels to a selected magazine, said rod serving to actuate the select mechanism whereby the same undergoes a cycle of operation.

17. A magnetic tape apparatus comprising a plurality of magnetic tape magazines each serving to carry magnetic tape, means replaceably holding said magnetic tape magazines in side-by-side relationship, transducing means adapted to operate on said tape, means for driving the tape past the transducing means, means for moving said driving and transducing means transversely of said magazines, and means for selectively advancing the transducing and driving means into cooperative relationship with a magazine whereby the tape is driven past the transducing means.

18. Apparatus as in claim 17 wherein said means for holding said magazines in side-by-side relationship comprise spaced locating bars, one of said bars including latching means, and one of said bars including spaced pivot pins and wherein said magazines include a notch adapted to engage the pin on said locating bar, and a holding groove adapted to be engaged by the latching means.

19. A magnetic tape apparatus comprising a plurality of magnetic tape magazines each including supply and take-up reels and serving to carry magnetic tape, means for replaceably holding said magnetic tape magazines in side-by-side relationship in said apparatus, latching means serving to engage said magazines and to hold the same in the apparatus, transducing means adapted to operate on the tape in the region between the reels, means for driving the tape past the transducing means, means for driving the take-up reel to wind the tape thereon, following operation on the same, means serving to engage the supply reel and to re-wind the tape upon the same following an operation on said magnetic tape, and means for selectively advancing the transducing means and driving means into cooperative relationship with a magazine whereby the tape is driven past the transducing means and wound upon the take-up reel.

20. Apparatus as in claim 19 wherein said latching means includes means for locking on an associated magazine whereby the re-wind means does not engage the supply reel to rewind the tape upon the same following an operation on the tape.

21. A magnetic tape apparatus comprising at least one magnetic tape magazine including supply and take-up reels and serving to carry magnetic tape on the same, a carriage, transducing means adapted to operate on the tape mounted on said carriage, means for driving the tape past the transducing means mounted on said carriage, means carried by the carriage engaging the peripheral edge of the take-up reel to drive the same to wind the tape thereon following an operation on the same, and means moving the carriage to bring the transducing, driving and take-up means into cooperative relationship with the magazine whereby the magnetic tape is driven past the transducing means and wound upon the take-up reel.

22. A magnetic tape apparatus comprising at least one magnetic tape magazine including supply and take-up reels and serving to carry magnetic tape on the same, a carriage transducing means adapted to operate on said tape mounted on the carriage, means for driving the tape past the transducing means mounted on said carriage, and means carried by the carriage engaging the peripheral edge of the take-up reel to wind the tape thereon following an operation on the same.

23. Apparatus as in claim 22 together with rewind means serving to engage the peripheral edge of the supply reel and serving to drive the reel to rewind the tape thereon.

24. A magnetic tape apparatus including at least one magnetic tape magazine including supply and take-up reels and serving to carry magnetic tape therein, a carriage transducing means adapted to operate on the tape mounted on the carriage, means for driving the tape past the transducing means mounted on the carriage, means mounted on the carriage for driving the take-up reel to wind the tape thereon following an operation upon the same, and means for releasably receiving said magazine whereby the tape and reels are brought into cooperative relationship with the transducing and driving means.

25. A magnetic tape apparatus comprising a plurality of magnetic tape magazines each serving to carry magnetic tape, means for supporting said magazines in side-by-side relationship in said apparatus, transducing means adapted to operate on the tape of a selected magazine, means for driving the tape past the transducing means, latching means for releasably holding said magazines in the supporting means, and spring means for urging said latching means against the magazine whereby the tape of a selected magazine is urged into cooperative relationship with the transducing and driving means.

References Cited in the file of this patent

UNITED STATES PATENTS

| | | |
|---|---|---|
| 2,106,374 | Goldhammer et al. | Jan. 25, 1938 |
| 2,384,637 | Owens | Sept. 11, 1945 |
| 2,466,514 | Vagtborg | Apr. 5, 1949 |
| 2,481,398 | Danisch | Sept. 6, 1949 |
| 2,507,385 | Shrader | May 9, 1950 |
| 2,519,725 | White | Aug. 22, 1950 |
| 2,821,576 | Gaubert | Jan. 28, 1958 |

FOREIGN PATENTS

| | | |
|---|---|---|
| 744,665 | Great Britain | Feb. 15, 1956 |